United States Patent [19]
Abe et al.

[11] 4,113,660
[45] Sep. 12, 1978

[54] PRODUCTION OF SHAPED CATALYSTS OR CARRIERS COMPRISING TITANIUM OXIDES

[75] Inventors: Kazunobu Abe, Izumi; Hiroaki Rikimaru, Nara; Iwao Yamazaki; Hiroshi Hasegawa, both of Osaka, all of Japan

[73] Assignee: Sakai Chemical Industry Co., Ltd., Sakai, Japan

[21] Appl. No.: 753,323

[22] Filed: Dec. 22, 1976

[30] Foreign Application Priority Data

Dec. 23, 1975 [JP] Japan ................................. 50-154606
Jul. 26, 1976 [JP] Japan ................................. 51-89429
Aug. 24, 1976 [JP] Japan ................................. 51-101350

[51] Int. Cl.$^2$ .................... B01J 21/04; B01J 21/06; B01J 21/08; B01J 23/22
[52] U.S. Cl. ................................. 252/455 R; 252/432; 252/435; 252/437; 252/440; 252/447; 252/454; 252/461; 423/239

[58] Field of Search ............... 252/461, 432, 435, 437, 252/447, 455 R, 440, 454; 423/239 A, 610; 106/73.3

[56] References Cited

U.S. PATENT DOCUMENTS 3,922,235  11/1975  DeLuca et al. ....................... 252/472
4,048,112   9/1977  Matsushita et al. .................. 252/461

*Primary Examiner*—W. J. Shine
*Attorney, Agent, or Firm*—H. Walter Haeussler

[57] ABSTRACT

A process for preparing shaped catalysts or carriers mainly containing titanium oxide and improved in mechanical strength which comprises calcining a material mainly comprising titanium oxide or a substance convertible into titanium oxide on calcination in the presence of metatitanic acid sol or gel, said metatitanic acid sol being the one prepared by deflocculation of metatitanic acid obtained in the course of the production of titanium oxide according to a conventional sulfuric acid process and said metatitanic acid gel being the one prepared by adjusting said metatitanic acid sol to pH 1 or higher.

17 Claims, No Drawings

PRODUCTION OF SHAPED CATALYSTS OR CARRIERS COMPRISING TITANIUM OXIDES

The present invention relates to production of shaped catalysts or carriers mainly comprising titanium oxide.

As catalysts or carriers comprising titanium oxide as the main ingredient, there are widely known various compositions. For example, shaped products of metal oxide mixtures comprising V, Ti, Cu, Zn, Sn, Pb, Fe, P, Cr, Co and Ni (Japanese Patent Publication (unexamined) No. 122473/1974), comprising Ti and Mo (Japanese Patent Publication (unexamined) No. 89291/1975) and comprising Ti and Ce (Japanese Patent Publication (unexamined) No. 23472/1976) have been reported as useful catalysts for elimination of nitrogen oxides from gases containing them by the use of ammonia as a reducing agent. Further, in Japanese Patent Publication (unexamined) No. 66277/1976, a shaped carrier comprising titanium oxide has been proposed as an excellent carrier for catalysts to be used for elimination of nitrogen oxides from gases containing them. In German Patent Offenlegungsschrift No. 2,534,281, a catalyst comprising $V_2O_5$ carried on titanium oxide is described as useful in the production of phthalic anhydride from o-xylene by oxidation. Uma. R has reported in Proc. Indian. Natl. Sci. Acad. Part A, 1975, 41, (1) that a catalyst comprising $ZnO\text{-}TiO_2$ is useful in dehydration reaction of isopropanol to obtain acetone. Furthermore, in Katalititcheskie Svoitva Veshestv, there has been proposed some catalyst compositions titanium oxide as the main ingredient.

In such catalyst or carrier comprising titanium oxide as the main ingredient, a shaped product having a large mechanical strength is hardly obtainable by a conventional shaping procedure, for instance, extrusion-shaping method or tumbling granulation method. Therefore, it is usually necessary to adopt tablet-shaping, to use a sintering-caking agent (e.g. aluminum powder) on shaping and calcine at 650° to 900° C (Japanese Patent Publication No. 43553/1973), or to calcine at 800° to 1200° C without using a sintering-caking agent for preparation of a shaped product having a large mechanical strength.

In the first method, however, the tabletting pressure must be raised for obtaining a sufficiently large mechanical strength, which diminishes the pore volume and makes the control of the pore structure difficult, so that a catalyst showing a high activity or an excellent selectivity or a carrier exhibiting a sufficient holding effect is not obtainable. In the second method, boric acid, alumina sol, silica sol or the like is employed as the sintering-caking agent. In case of using boric acid, an amount of approximately 15 parts by weight or more to 1 part by weight of the catalyst or carrier is required in order to obtain a satisfactory mechanical strength for catalyst or carrier. However, the addition of such a large amount of boric acid can not afford a catalyst having a high activity or a carrier showing a sufficient holding effect, because the boric acid added is converted into a glassy material, which blocks pores of titanium oxide or covers the active surface of the catalytically active substance. In case of using silica sol or alumina sol, a sufficient mechanical strength is not obtainable, and the characteristic properties of the produced catalyst mainly comprising titanium oxide may be sometimes changed. In the third method, the remarkable crystallization of titanium oxide occurs so that the same defects as seen in the first method is produced.

According to the present invention, there is provided a novel process for production of a shaped catalyst mainly comprising titanium oxide, having high activity and large specific surface area and pore volume and being excellent in mechanical strength, wearing strength and adhesion strength or a shaped carrier mainly comprising titanium oxide, showing satisfactory specific surface area, pore volume and pore distribution and having excellent mechanical strength, wearing strength and adhesion strength, which comprises calcining a material mainly comprising titanium oxide or a substance convertible into titanium oxide on calcination in the presence of metatitanic acid sol prepared by deflocculation of metatitanic acid obtained in the course of the production of titanium oxide according to a conventional sulfuric acid process, or metatitanic acid gel prepared by adjusting said metatitanic acid sol to pH 1 or higher (preferably pH 1 to 7) at a temperature of 200° to 800° C (preferably 300° to 700° C).

In case that a small specific surface area or a small pore volume is required depending on the catalyst reaction, the calcination may be effected at a higher temperature, i.e. from 800° to 1200° C.

In Japanese Patent Publication (unexamined) No. 94589/1974, it is described that a vanadium-titanium catalyst having an excellent wearing resistance can be obtained by calcination at 400° to 600° C in the presence of orthotitanic acid gel. Metatitanic acid sol or gel to be used in the present invention acts efficiently as a binder for titanium oxide to afford a better effect, compared with orthotitanic acid gel. Further, metatitanic acid sol or gel can be prepared more easily and economically with lower cost than orthotitanic acid gel.

In Japanese Patent Publication (unexamined) No. 1098/1975, on the other hand there is disclosed a process for preparation of titania gel as well as a process for preparation of a titania catalyst carrier from such gel. However, the catalyst carrier prepared by this process is substantially different from the one prepared by the process of this invention.

In case that a larger mechanical strength is required for a catalyst or carrier to be prepared by the process of the invention, a certain amount (e.g. not more than about 30% by weight) of silica sol, clay, titanium sulfate or ceramic fiber, a small amount (e.g. not more than about 5% by weight) of a vanadium compound, carbon, a borate, a silicate or a phosphate may be incorporated into the starting composition to obtain a catalyst or carrier having a desired mechanical strength without substantial deterioration of the characteristic properties of the catalyst or carrier.

When the said catalyst or carrier is applied on a previously shaped substrate to form a coating thereon, silica sol or titanium sulfate may be further incorporated in addition to metatitanic acid sol or gel in order to increase the adhesion strength.

The catalyst or carrier obtained according to the invention which comprises mainly titanium oxide may be used for various uses. It is particularly suitable for the use as a catalyst or carrier for elimination of nitrogen oxides using ammonia as a reducing agent.

Preparation of the catalyst or carrier of the invention may be carried out by various procedures, of which typical examples are as follows:

Procedure 1

To a starting material mainly comprising metatitanic acid, previously prepared metatitanic acid sol and/or gel are added, or alternatively a deflocculation agent for metatitanic acid or both a deflocculation agent and a gelation agent are added to cause deflocculation or gelation of all or a part of metatitanic acid in the composition, whereby the content of metatitanic acid sol and-/or gel is made to 1 to 100% by weight (as titanium oxide) based on the weight of the catalyst or carrier. When a catalyst or carrier having a larger mechanical strength is desired, at least one of vanadium compounds, carbon, borates, silicates and phosphates and-/or at least one of titanium sulfate, silica sol, clay and glass fiber are incorporated in amounts within the above mentioned ranges. The resultant mixture is subjected to spray drying or adjustment of water content in the starting material and shaping by an optional shaping procedure (preferably extrusion), followed by calcination to obtain a catalyst or carrier. When desired, a shaping-promoting agent such as fine crystalline cellulose (e.g. avicel) or CMC may be added to the said mixture prior to the shaping.

This procedure does not require a pulverization step, which makes the production cost relatively low. However, the size of the particles constituting the shaped product can not be controlled so that regulation of pore structure is difficult.

Procedure 2

To a starting material mainly comprising powdery titanium oxide, previously prepared metatitanic acid sol and/or gel are added to make a content of 1 to 100% by weight (as titanium oxide) based on the weight of the catalyst or carrier. When a catalyst or carrier having a larger mechanical strength is desired, at least one of vanadium compounds, carbon, borates, silicates and phosphates and/or at least one of titanium sulfate, silica sol, clay and glass fiber are incorporated in amounts within the above mentioned ranges. The resulting mixture is then subjected to spray drying or adjustment of water content and shaping by an optional shaping procedure (preferably extrusion), following by calcination to obtain a catalyst or carrier. When desired, a shaping-promoting agent as mentioned above may be incorporated into the said mixture prior to the shaping.

According to this procedure, the size of the particles constituting the shaped product can be controlled, which makes it possible to obtain a catalyst or carrier having a desired structure.

Procedure 3

Metatitanic acid sol and/or gel are made present in a metatitanic acid-contaning starting material as in Procedure 1, and the resultant mixture is dried and calcined. The calcined product is, after pulverization into powder, shaped using an inorganic binder such as silica sol or alumina sol, if necessary, in the presence of a shaping-promoting agent such as fine crystalline cellulose or CMC by an optional shaping procedure (preferably extrusion or tumbling granulation), dried and calcined to obtain a catalyst or carrier. When a carrier or catalyst having a larger mechanical strength is desired, at least one of vanadium compounds, carbon, borates, silicates and phosphates and/or at least one of titanium sulfate, silica sol, clay and glass fiber may be incorporated in amounts within the above mentioned ranges.

The catalyst or carrier obtained by this procedure shows an extremely large mechanical strength under the same shaping conditions in comparison with the case that other titanium oxide powder is shaped with a binder such as silica sol. The size of the particles constituting the shaped product can be controlled, which makes it possible to obtain a catalyst or carrier having a desired pore structure.

Procedure 4

In a metatitanic acid-containing starting material, metatitanic acid sol and/or gel are made present as in Procedure 1, and the resultant mixture is dried and calcined. The calcined product is, after pulverized into powder, shaped using a metatitanic acid sol or gel as a binder, if necessary, together with the above mentioned shaping-promoting agent by an optional shaping procedure (preferably tumbling granulation). The shaped product is dried and calcined to obtain a catalyst or carrier. In this procudure too, at least one of vanadium compounds, carbon, borates, silicates and phosphates and/or at least one of titanium sulfate, silica sol, clay and ceramic fibers may be incorporated in amounts within the above mentioned ranges.

According to this procedure, there can be obtained a catalyst or carrier which has the same merits and even a larger mechanical strength, compared with the case of Procedures 2 and 3.

Procedure 5

To titanium oxide and/or a substance convertible into titanium oxide on calcination, a catalyst material or the starting material for catalyst in the form of solution, sol, gel or powder and/or a carrier material or the starting material for carrier in the form of solution, sol, gel or powder are added, and metatitanic acid sol and/or gel are further added thereto. The resultant mixture is shaped by an optional shaping procedure, dried and calcined to obtain a shaped catalyst. For the same purpose as in Procedures 1, 2 and 3, at least one of vanadium compounds, carbon, borates, silicates and phosphates and/or at least one of titanium sulfate, silica sol, clay and ceramic fiber are incorporated in amounts within the above mentioned ranges.

According to this procedure, an impregnation step is not required so that the decrease of the mechanical strength of the catalyst due to impregnation is not caused, and the production step is shortened. Besides, treatment of waste water or gases becomes unnecessary, which makes the production cost low.

Procedure 6

To a starting material mainly comprising titanium oxide or a substance convertible into titanium oxide on calcination, metatitanic acid sol and/or gel and, if necessary, silica sol are added to prepare a suspension, into which a previously shaped inactive material such as cordierite, murite or α-alumna is immersed. Then, the inactive material is taken out from the suspension, and after elimination of excess liquid or slurry, subjected to drying and calcination to obtain a shaped catalyst or carrier in which a coating of catalyst or carrier material such as titanium oxide is formed on the inactive material.

According to this procedure, the shaped substrate having a large mechanical strength is previously prepared, and the catalyst or carrier material is then applied to the surface of the substrate. Therefore, this procedure is the most suitable for preparation of a shaped catalyst having a complicated structure (e.g honeycomb structure) in which a large mechanical strength can be obtained only with difficulty by an ordinary procedure.

As to titanium oxide, there are known three forms, i.e. rutile, brookite and anatase, which are all utilizable as the starting material in the present invention. In case that the catalyst or carrier is used for elimination of nitrogen oxides, the use of the anatase form is preferred. When the catalyst or carrier is employed in the catalytic oxidation of butene in a gaseous phase to obtain acetic acid, the use of the rutile form is desirable (Japanese Patent Publication (unexamined) No. 94589/1974).

Titanium oxide or a substance convertible into titanium oxide on calcination is preferably used in a powder form, because a uniform catalyst can be obtained and the pore distribution and the pore volume as well as the mechanical strength can be adjusted by control of the particle size of the powder.

When a large mechanical strength of the shaped product is required, there may be employed titanium oxide powder which is obtained by incorporating at least one of metatitanic acid sol and metatitanic acid gel into metatitanic acid and subjecting the mixture to drying, calcination and pulverization. The shaped product is advantageous in being not practically contracted on calcination. When a catalyst or carrier having a large surface area is desired, there may be employed titanium oxide powder obtained by calcining metatitanic acid at a temperature of 500° C or lower and subjecting the calcined product to pulverization.

The substance convertible into titanium oxide on calcination may be, for instance, a lower oxide of titanium (e.g. $Ti_2O_3$ obtained by reducing roasting ilumenite and extracting it by an acid), a volatile titanium compound such as titanium tetrachloride, lower alkyl titanante (e.g. isopropyl titanate), metatitanic acid, orthotitanic acid, etc. Among them, metatitanic acid is the most preferable in respect of convenience in handling and production cost.

In the catalyst of the invention, the metatitanic acid sol or gel serves as a binder combining titanium oxide, the catalyst material, the inactive material and the carrier material firmly. The combination between the catalyst material and the carrier material thus attained by the metatitanic acid sol or gel makes an excellent holding effect which is hardly obtained by mere admixture of the catalyst material and the carrier material.

The metatitanic acid sol or gel also serves, in the carrier of the invention, as a binder combining titanium oxide, the other carrier material and the inactive material firmly. The calcined product containing such a binder shows a large mechanical strength, and the powder obtained by pulverization of such calcined product can afford a shape product showing a small contraction rate and being rich in macropores to prevent cracking at impregnation.

The metatitanic acid sol to be used in the invention may be prepared from metatitanic acid (composition: $TiO(OH)_2$, 40.4 – 49.0% by weight; $H_2SO_4$, 2.0 – 3.2% by weight; $H_2O$, 47.8 – 57.6% by weight) obtained in the course of the production of titanium oxide according to a conventional sulfuric acid process by elimination of sulfuric acid present therein as barium in sulfate and deflocculation of the resulting metatitanic acid with hydrochloric acid, or addition of barium chloride to the said metatitanic acid. The metatitanic acid sol can be converted into a gel form under pH of 1 or higher, preferably 1 to 7. Adjustment of such pH may be effected, for instance, by the use of ammonia. The amount of the metatitanic acid sol or gel to be used in the invention may be 1 to 100% by weight as titanium oxide to the weight of the catalyst or carrier. In usual, an amount of 5 to 20% by weight can afford a product having a sufficient quality. Preparation of the metatitanic acid sol or gel may be effected in the starting material comprising metatitanic acid by deflocculating all or a part of it, prior to heating, calcination and shaping.

Titanium sulfate as an optional component contributes to the combination between the particles of the carrier or catalyst material and the substrate. For this mechanism, it is supposed that the titanium sulfate is decomposed in these particles, and the thus decomposed product serves as a binding agent for these particles. The titanium sulfate may be, for example, titanium oxysulfate, titanous sulfate or titanic sulfate or an aqueous solution thereof. The amount of the titanium sulfate to be used is preferably 1 to 30% by weight as titanium oxide to the weight of the catalyst or carrier. When the amount is less than 1% by weight, a sufficient improvement in strength can not be expected. Even if it is used in an amount of more than 30% by weight, the binding effect is not much enhanced.

Vanadium oxide has a relatively low melting point and can promote the sintering between the particles of the catalyst or carrier material at a temperature which does not make progress the sintering of the catalyst or carrier components such as titanium oxide. Therefore, a carrier having a sufficient mechanical strength and large porosity and surface area, and a catalyst having a satisfactory mechanical strength and showing high activity are obtainable.

The vanadium compound may be the one which can be converted into vanadium oxide on calcination. Specific examples are vanadium pentoxide and vanadium sesquioxide. For increasing sufficiently the strength of the shaped product, the vanadium compound is desired to be more uniformly admixed with the starting material for catalyst or carrier such as titanium oxide, and the use of a water-soluble vanadium compound such as ammonium metavanadate, vanadyl sulfate or vanadyl oxalate is preferred. The amount of the vanadium compound to be used is preferably 1 to 5% by weight as vanadium oxide to the catalyst or carrier such as titanium oxide. When the amount is less than 1% by weight, a sufficient strength can not be attained. When it is more than 5% by weight, a satisfactory porosity and surface area or activity can not be obtained, because vanadium oxide acts as a sintering-promoting agent.

A borate having a low melting point serves as a sintering-promoting agent. When the calcination is effected at 500° to 700° C, the use of lead borate is most preferred. When it is carried out at 650° to 800° C, zinc borate is the most desirable. The amount of the borate to be used is usually from 2 to 5% by weight to the catalyst or carrier such as titanium oxide. Since the borate having a low melting point also acts as a sintering-promoting agent like vanadium oxide, the amount of the borate added is naturally in direct proportion to the mechanical strength and in inverse proportion to the specific surface area or activity.

The addition of carbon brings about an effect for increase of the mechanical strength without reducing the holding effect of the carrier or the activity of the catalyst. The mechanism of this effect is not yet well clarified. Supposedly, the carbon acts as a reducing agent to reduce a part of titanium oxide, and when the thus produced transitory lower metal oxide or the metal is sintered, carbon monoxide or carbon dioxide is generated by combustion of carbon, whereby the space occupied by the carbon at the shaping step is converted into pores.

The carbon to be used in the invention may be a carbonaceous material such as fine powder of coke, active carbon or coal, graphite or carbon black. The amount of the carbon to be used is usually from 1 to 5% by weight to the weight of titanium oxide in the carrier or the catalyst.

The specific surface area of the calcined product can be further increased by supplemental silicate-treatment. This phonomenon is based on the preventing effect, exerted by $Si(OH)_4$ produced by neutralization of the system, to both the growth of the primary particles of $TiO_2$ and the rutile transition due to calcination. This treatment is particularly preferred in case of the calcination of 700° to 800° C. The amount of the silicate to be used is usually 0.5 to 5.0% by weight as $SiO_2$ to the weight of titanium oxide in the carrier or the catalyst. As the silicate, sodium silicate is the most desirable. Depending on the use of the catalyst or the carrier, however, sodium may sometimes act as a catalyst poison. In such case, another silicate may be appropriately selected.

The phosphate seems to exert the same effect as the silicate. Probably, the phosphate has an influence upon the crystal lattice of primary particles of $TiO_2$ constituting the shaped product at the calcination to prevent their growth, which results in increase of the specific surface area and the pore volume and high activity. As the phosphate, there may be advantageously employed ammonium primary phosphate, ammonium secondary phosphate and ammonium tertiary phosphate. The amount of the phosphate to be used is usually 0.1 to 5% by weight as $P_2O_5$ to the weight of titanium oxide in the catalyst or the carrier. As to the phosphate, phosphorus may sometimes act as a catalyst poison, and therefore it should be employed with care.

The silica sol may be a commercially available colloid solution comprising ultrafine particles of anhydrous silicic acid dispersed in water. The amount of the silica sol to be used is usually from 2 to 30% by weight as $SiO_2$ to the weight of the catalyst or carrier. When the amount is less than 2% by weight, a sufficient effect is not obtainable. When it is more than 30% by weight, the quality of titanium oxide is frequently deteriorated. The addition of the silica sol increases the effect of the metatitanic acid sol or gel as a binder.

As the clay, sedimentary clay (e.g. Kibushi clay, shale) is the most preferable. The amount to be used is usually from 2 to 30% by weight to the weight of the catalyst or the carrier.

The ceramic fiber may be the one made of a material which does not reduce the catalytic activity and selected from conventional ceramic fibers (e.g. $Al_2O_3$-$SiO_2$ fiber, $ZrO_2$ fiber, $SiO_2$ fiber, glass fiber). The size of the ceramic fiber may be suitably decided depending on the shaping method or the materials for shaping. For example, in case of tumbling granulation method, a fiber diameter of 1 to 20$\mu$ and a fiber length of 10 to 1000$\mu$ are preferred, and in case of the extrusion molding method, a fiber diameter of 1 – 20$\mu$ and a fiber length of 50 – 600$\mu$ are favorable. The amount to be used is usually not more than 30% by weight, and most usually from 0.5 to 30% by weight to the weight of the catalyst or the carrier. The ceramic fiber serves as an inner-reinforcing agent for the carrier or the catalyst to increase the mechanical strength and the impact strength. In case of using a catalyst or a carrier in acidic atmosphere for a long time, glass fiber comprising $SiO_2$ in 10 – 65% by weight, $Al_2O_3$ in 2 – 6% by weight, CaO + MgO in 15 – 20% by weight and $Na_2O$ + $K_2O$ in 8 – 12% by weight is preferred.

Practical and presently preferred embodiments of the invention are illustratively shown in the following Examples wherein % is by weight.

EXAMPLE 1

To a wet cake of metatitanic acid obtained as the intermediate in the projection of titanium oxide by a conventional sulfuric acid process (10 kg as titanium oxide), barium chloride ($BaCl_2.2H_2O$) (2 kg) is added to precipitate sulfuric acid adhering or being adsorbed to metatitanic acid as barium sulfate and to effect defloculation with hydrochloric acid at the same time, whereby metatitanic acid sol (8 liters) having a solid content of 540 g/l (as titanium oxide) is obtained. In the subsequent steps, the thus obtained sol is usually employed as dilution.

EXAMPLE 2

To the metatitanic acid sol obtained in Example 1 210% aqueous ammonia is added under stirring to convert the sol into a gel. The pH value at this time is 2.

EXAMPLE 3

To a wet cake of metatitanic acid as used in Example 1 (1 kg), barium chloride ($BaCl_2.2H_2O$) (42 g) is added, and after sufficient stirring and subsequent regulation of water content, the mixture is extruded through an extrusion-shaping machine (diameter of die, 5 mm). The shaped product is dried at 100° C for 12 hours and then calcined at 600° C for 3 hours in the air to obtain a shaped titanium oxide carrier in a cylinder form.

EXAMPLE 4

To a wet cake of metatitanic acid as used in Example 1 (28.5 kg), barium chloride ($BaCl_2.2H_2O$) (0.7 kg) in water (3 liters) is added for deflocculation, and the resultant mixture is well stirred to obtain a slurry, which is then subjected to spray drying by the aid of a spray dryer under the following condition: temperature of atmosphere, 95° to 105° C; rotation speed of atomizer, 10,000 rpm; feed speed, 1.5 l/min. The dried product is calcined at 900° C for 4 hours in an oxidizing atmosphere to obtain a composition for fluidized bed having a specific surface area of 15.2 m²/g, an apparent density of 1.5 g/ml and an average particle size of 55 to 65 $\mu$ and showing an angle of repose of 28.1° and a wearing rate of 0.05 %/hr (wearing test: JIS (Japanese Industrial Standard) K1464).

EXAMPLE 5

To metatitanic acid as used in Example 1 (1 kg as titanium oxide), metatitanic acid gel (200 g) obtained in Example 2, sodium silicate (10 g) and vanadyl sulfate (25 g) are added, and the resulting mixture is treated in the same manner as in Example 3 to obtain a shaped carrier in a cylinder form.

EXAMPLE 6

Metatitanic acid (0.8 kg as titanium oxide) and aluminum hydroxide (1 kg as aluminum oxide) are mixed together by the aide of a blender, and a dilution of the metatitanic acid sol obtained in Example 1 (200 g/l as titanium oxide) (1 kg) is added thereto. The mixture is well kneaded by the aid of a kneader and, after dried at 120° C for 12 hours, heated at 600° C for 3 hours in the air. The heated product is pulverized by a centrifugal pulverizer, from which the screen has been previously taken off. To the pulverized product thus obtained (2 kg), fine crystalline cellulose "Avicel" (100 g) and 20% alumina sol (1 kg) are added and kneaded by a kneader. After regulation of water content, the mixture is extruded through an extrusion-shaping machine (diameter of die, 5 mm), and the shaped product is dried at 100° C for 12 hours and then calcined at 600° C for 3 hours in the air to obtain a shaped carrier in a cylinder form.

EXAMPLE 7

Orthotitanic acid (1 kg as titanium oxide) obtained by neutralization-hydrolysis of titanyl sulfate is calcined at 700° C for 3 hours and then pulverized by the aid of a centrifugal pulverizing machine without screen to obtain titanium oxide powder. The thus obtained titanium oxide powder is portionwise introduced into a pan pelletizer in which the nuclear substance has been previously charged while spraying a 250 g/l (as titanium oxide) metatitanic acid sol prepared by adding titanous sulfate to the metatitanic acid sol used in Example 6 to effect sphere-shaping. The thus obtained shaped product being 5 mm in average particle size is dried at 100° C for 12 hours and then calcined at 900° C for 3 hours to obtain a shaped titanium oxide in sphere form.

EXAMPLE 8

A metatitanic acid cake (2.5 kg as titanium oxide) is charged in a kneader, and barium chloride ($BaCl_2.2H_2O$) (63 g) is added thereto and kneaded well to cause partial deflocculation of metatitanic acid. The kneaded product is dried at 100° C for 12 hours and then calcined at 600° C for 3 hours. The calcined product is pulverized by the aid of a centrifugal pulverizing machine from which the screen is previously taken off. To the thus pulverized product (2.5 kg), "Avicel" (150 g) is added and well dispersed, and the resultant mixture is portionwise added together with the metatitanic acid sol as used in Example 6 to a pan pelletizer in which the nuclear substance has been previously charged to obtain a shaped product of 5 mm in diameter in a sphere for, which is dried for 12 hours and then calcined at 600° C for 3 hours in the air to obtain a shaped carrier in a sphere form being 5 mm in average diameter.

EXAMPLE 9

Dried metatitanic acid powder (0.8 kg as titanium oxide) and aluminum hydroxide powder (1 kg as aluminum oxide) are admixed by the aid of a blender, and metatitanic acid sol (150 g/l, 1kg) obtained by diluting the metatitanic acid sol prepared in Example 1, ammonium primary phosphate (30 g) and carbon (20 g) are added thereto. After regulation of water content, the mixture is kneaded by the aid of a kneader, dried at 120° C for 12 hours and then calcined at 700° C for 3 hours. The calcined product thus obtained is roughly pulverized by the aid of a centrifugal pulverizing machine from which the screen has been previously taken off. To the thus obtained product (about 2 kg), "Avicel" (100 g) and the metatitanic acid sol (0.5 kg) mentioned above are added, and the resultant mixture is, after regulation of water content, kneaded by the aid of a kneader and extruded through an extrusion-shaping machine having a die with extrusion hole in a honeycomb form (cell pitch, 5 mm square). The extruded product is uniformly dried at 100° C for 12 hours and then calcined at 600° C for 3 hours in the aire to obtain a shaped carrier in a honeycomb form with cell pitch of 5 mm square.

EXAMPLE 10

To dried metatitanic acid powder (1 kg), the metatitanic acid sol used in Example 9 (500 g) and 20% silica sol (as $SiO_2$) (300 g) are added, and the resultant mixture is, after regulation of water content, kneaded by the aid of a kneader, dried at 120° C for 12 hours and then calcined at 700° C for 3 hours in the air. The calcined product is pulverized by the aid of a centrifugal pulverizing machine from which the screen has been previously taken off. To the roughly pulverized product thus obtained (about 1 kg), "Avicel" (50 g), zinc borate (10 g) and the metatitanic acid sol (300 g) as mentioned above are added, and the mixture is, after regulation of water content, extruded through an extrusion-shaping machine (die diameter, 5 mm). The extruded product is dried at 100° C for 12 hours and then calcined at 600° C for 3 hours in the air to obtain a shaped carrier in a cylinder form.

EXAMPLE 11

To dried metatitanic acid powder (1 kg), the metatitanic acid sol used in Example 6 (500 g) is added, and the mixture is, after regulation of water content, kneaded by the aid of a kneader, dried at 120° C for 12 hours and then calcined at 600° C for 3 hours in the air. The calcined product is pulverized by the aid of a centrifugal pulverizing machine from which the screen has been previously taken off. To the roughly pulverized product thus obtained (about 1 kg), shale clay (300 g) and silica fiber being $5\mu$ in average fiber diameter and $100\mu$ in average fiber length (30 g) are added and blended well by the aid of a blender, and the resultant mixture is portionwise introduced into a pan pelletizer in which the nuclear substance has been previously charged while spraying the metatitanic acid sol used in Example 9 to effect sphere-shaping. The shaped product being 5 mm in average particle size is dried at 100° C for 12 hours and then calcined at 600° C for 3 hours to obtain a shaped titanium oxide carrier in a sphere form.

EXAMPLE 12

Metatitanic acid (1 kg as titanium oxide) and the metatitanic acid gel used in Example 5 (500 g) are mixed together and, after regulation of water content, kneaded by the aid of a kneader. The resultant mixture is dried at 120° C for 12 hours and then calcined at 600° C for 3 hours in the air. The calcined product is pulverized by the aid of a centrifugal pulverizing machine having a screen of 1 mm$\phi$. To the pulverized product thus obtained, the silica sol mentioned above (300 g), the metatitanic acid sol used in Example 9 (300 g) and silica fiber being $5\mu$ in average fiber diameter and $500\mu$ in average fiber length (40 g) are added, and the mixture is, after regulation of water content, kneaded well by the aid of a kneader and extruded through an extrusion-shaping machine having a die with extrusion hole in a honeycomb form (cell pitch, 5 mm square). The extruded product is uniformly dried at 100° C for 12 hours and then calcined at 600° C for 3 hours to obtain a shaped carrier in a honeycomb form with cell pitch of 5 mm square.

EXAMPLE 13

To a mixture of titanium oxide powder (150 g) obtained by calcination of metatitanic acid at 600° C for 3 hours, glass beads of 2 mm in diameter (850 ml) and the metatitanic acid sol obtained in Example 1 (80 g), a 0.5% aqueous solution of methylcellulose is added to make 1 liter, and the resultant mixture is stirred for 30 minutes. The glass beads are eliminated and, into the thus obtained suspension, a commercially available substrate in a honeycomb form made from cordierite (cell pitch, 5 mm square) (300 ml) is immersed and then taken out therefrom. After elimination of excess suspension by a gas stream, the substrate is dried at 60° C for 10 hours. This operation is repeated 3 times to obtain a shaped product in a honeycomb form coated with titanium oxide in a coating thickness of about 100 $\mu$. The thus obtained shaped product is calcined at 600° C for 3 hours in the stream of $N_2$ containing 5% of $H_2$ to obtain a shaped carrier in a honeycomb form coated with titanium oxide.

EXAMPLE 14

To a mixture of titanium oxide powder obtained by calcination of orthotitanic acid at 600° C for 3 hours (150 g), glass beads of 2 mm in diameter (850 ml), the metatitanic acid sol employed in Example 13 (40 g) and silica sol (40 g), a 0.5% aqueous solution of methylcellulose is added to make 1 liter, and the resultant mixture is stirred for 30 minutes. The glass beads are eliminated, and into the thus obtained suspension, a commercially available substrate in a honeycomb form made from cordierite (cell pitch, 5 mm square) (300 ml) is immersed and then taken out therefrom. After elimination of excess liquid by a gas stream, the substrate is dried at 60° C for 10 hours. This operation is repeated 2 times to obtain a shaped product in a honeycomb form coated with titanium oxide in a coating thickness of about 100 $\mu$. The shaped product is calcined at 600° C for 3 hours in the air to obtain a shaped carrier in honeycomb form coated with titanium oxide.

EXAMPLE 15

Each of the carriers obtained in Examples 3, 5, 8, 10, 12 and 13 (200 ml) is immersed for 1 hour in an aqueous solution of vanadium oxalate (200 ml) prepared by dissolving ammonium metavanadate (49 g) in an aqueous solution containing oxalic acid (140 g) and kept at 60° C. Then, the carrier is taken out from the solution, and after elimination of excess liquid, dried at 100° C for 12 hours, followed by calcination at 450° C for 3 hours to give a vanadium oxide catalyst.

The thus prepared catalyst is charged into a Pyrex glass tube being 50 mm in inner diameter (the outside being warmed) to make an apparent volume of 86 ml, and a gaseous mixture having a composition as shown in Table 1 is introduced therein at 350° C at a space velocity of 10,000 l/hr (calculated at normal temperature). The nitrogen oxide-eliminating rate is determined according to the following equation, and the results are shown in Table 2:

Nitrogen oxide-eliminating rate (%) =

$$\frac{\text{Concentration of } NO_x \text{ at entrance of catalyst layer} - \text{Concentration of } NO_x \text{ at exit of reaction tube}}{\text{Concentration of } NO_x \text{ at entrance of catalyst layer}} \times 100$$

Table 1

|  | NO | $NH_3$ | $H_2O$ | $CO_2$ | $SO_2$ | $H_2$ |
|---|---|---|---|---|---|---|
| Gaseous mixture | 200 (ppm) | 270 (ppm) | 10 (%) | 12 (%) | 1000 (ppm) | residue |

Table 2

| Catalyst | Nitrogen oxide-elimination rate (%) |
|---|---|
| Example 3 and Example 15 | 99.2 |
| Example 5 and Example 15 | 89.0 |
| Example 8 and Example 15 | 99.6 |
| Example 10 and Example 15 | 90.1 |
| Example 12 and Example 15 | 99.9 |
| Example 13 and Example 15 | 99.8 |

EXAMPLE 16

A mixture of an aqueous solution of vanadyl oxalate (330 ml) containing vanadium pentoxide (50 g), the above mentioned silica sol (240 ml), the metatitanic acid sol used in Example 13 (240 ml) and a suspension (900 ml) containing the pulverized product obtained in Example 8 (300 g) is pulverized and dispersed well in the presence of glass beads. Into the resultant suspension, a substrate in a honeycomb form made from cordierite (cell pitch, 5 mm square) (500 ml) is immersed and then taken out therefrom. After elimination of the excess liquid by a gas stream, the substrate is dried at 60° C for 10 hours and then calcined at 600° C for 3 hours to obtain a shaped catalyst in a honeycomb form.

EXAMPLE 17

To metatitanic acid obtained in the production of titanium oxide by a conventional sulfuric acid process (1 kg as titanium oxide), barium chloride ($BaCl_2.2H_2O$) (42 g) and ferric oxide ($Fe_2O_3$) (100 g) are added in order, and the resultant mixture is kneaded well, dried at 100° C for 12 hours and then calcined at 500° C for 3 hours. The calcined product thus obtained is pulverized by the aid of a centrifugal pulverizing machine from which the screen has been previously taken off. The pulverized product is portionwise introduced into a pan pelletizer in which the nuclear substance has been previously charged while spraying the metatitanic acid sol (content of titanium oxide, 200 g/l) used in Example 12 to effect sphere-shaping. The thus obtained shaped product of 5 mm in diameter is dried at 100° C for 12 hours and then calcined at 500° C for 3 hours to obtain a shaped catalyst in a sphere form.

EXAMPLE 18

The same powder as prepared in Example 17 (1 kg) and glass fiber comprising $SiO_2$ in 24%, $Al_2O_3$ in 3%, CaO + MgO in 15% and $Na_2O$ in 11% (40 g) being 5$\mu$ in average fiber diameter and 100$\mu$ in average fiber length (40 g) are well blended by a blender, and the resultant mixture is portionwise introduced into a pan pelletizer in which the nuclear substance has been previously charged while spraying the metatitanic acid sol used in Example 6 to effect sphere-shaping. The thus obtained shaped product of 5 mm in average particle size is dried at 100° C for 12 hours and then calcined at 500° C for 3 hours to obtain a shaped catalyst in a sphere form.

EXAMPLE 19

The same powder as prepared in Example 17 (1 kg), vanadyl sulfate (30 g), ammonium primary phosphate (30 g) and the metatitanic acid sol employed in Example 6 are charged into a kneader and, after regulation of water content, the components are kneaded well. The kneaded product is extruded through an extrusion-shaping machine having a die of 5 mm in diameter, and the extruded product is dried at 100° C for 12 hours and then calcined at 550° C for 3 hours to obtain a shaped catalyst in a cylinder form.

EXAMPLE 20

Synthetic rutile prepared by subjecting ilmenite powder to reducing roasting and then to extraction with an acid (the quality of the titanium oxide component in ilmenite being raised) (1 kg), 20% alumina sol (as $Al_2O_3$) (1 kg) and the metatitanic acid gel used in Example 5 (1 kg) are mixed together, and after regulation of water content, the mixture is kneaded well. The kneaded product is extruded through an extrusion-shaping machine having a die of 5 mm in diameter. The shaped product is dried at 100° C for 12 hours and then calcined at 600° C for 3 hours in the air to obtain a shaped catalyst in a cylinder form.

EXAMPLE 21

Metatitanic acid prepared by hydrolysis of titanium tetrachloride under heating (1 kg as titanium oxide), zinc hydroxide gel (1 kg as ZnO) and the metatitanic acid sol obtained by diluting the metatitanic acid sol prepared in Example 6 (1 kg) are mixed together and, after regulation of water content, the mixture is kneaded well. The kneaded product is extruded through an extrusion-shaping machine having a die of 2 mm in diameter. The extruded product is dried at 100° C for 12 hours and then calcined at 500° C for 3 hours to obtain a shaped $ZnO-TiO_2$ catalyst in a cylinder form.

EXAMPLE 22

Titanium oxide powder obtained by calcination of metatitanic acid at 600° C for 3 hours (900 g) and copper oxide powder obtained by calcination of copper nitrate (100 g) are blended under a dry condition by the aid of a blender. The resultant powder mixture is portionwise introduced into a pan pelletizer in which the nuclear substance has been previously charged while spraying the metatitanic acid sol used in Example 6 to obtain a shaped product in a sphere form being 5 mm in average size, which is dried at 100°C for 12 hours and then calcined at 500°C for 3 hours to obtain a shaped catalyst.

EXAMPLE 23

Titanium oxide powder used in Example 22 (1 kg), shale clay (300 g), glass fiber used in Example 12 (30 g), metatitanic acid sol used in Example 6 (500 g), silica sol used in Example 10 (300 g), tungsten oxide (50 g) and uranium oxide powder (100 g) are charged into a kneader, and after regulation of water content, the components are kneaded well. The kneaded product is extruded through an extrusion-shaping machine having a die of 5 mm in diameter. The extruded product is dried at 120° C for 12 hours and then calcined at 500° C for 3 hours to obtain a shaped catalyst in a cylinder form.

EXAMPLE 24

Using each of the catalysts obtained in Examples 16, 17, 18, 22 and 23, the same reaction as in Example 15 is carried out, and the nitrogen oxide-eliminating rate is determined. The results are shown in Table 3.

Table 3

| Catalyst | Nitrogen oxide-elimination rate (%) |
|---|---|
| Example 16 | 99.8 |
| Example 17 | 92.3 |
| Example 18 | 92.0 |
| Example 22 | 94.4 |
| Example 23 | 99.5 |

EXAMPLE 31

On each of the carriers or catalysts obtained in Examples 3, 5, 6, 7, 8, 9, 10, 11, 12, 16, 17, 18, 19, 20, 21 and 22, the compressive breaking strength (strength to the radius direction in case of a shaped product being in a cylinder form or strength per unit area in axial direction in case of a shaped product being in a honeycomb form), the specific surface area, the micropore volume and the average micropore diameter are measured. The determination of the compressive breaking strength is effected by the use of a Hiya type hardness tester. The specific surface area is determined by the BET method, and the micropore volume and the average micropore diameter are determined by the mercury penetration method.

Table 4

| Example No. | Compressive breaking strength (kg or kg/cm²) | Specific surface area (m²/g) | Micropore volume (ml/g) | Average diameter of micropore (Å) |
|---|---|---|---|---|
| 3 | 7.2 | 50 | 0.30 | 330 |
| 5 | 13.8 | 31 | 0.28 | 318 |
| 6 | 9.5 | 100 | 0.43 | 232 |
| 7 | 21.6 | 13 | 0.20 | 394 |
| 8 | 12.2 | 42 | 0.35 | 351 |
| 9 | 200 | 111 | 0.31 | 200 |
| 10 | 13.4 | 33 | 0.30 | 321 |
| 11 | 14.8 | 47 | 0.32 | 324 |
| 12 | 230 | 46 | 0.29 | 235 |
| 16 | 12.6 | 31 | 0.33 | 311 |
| 17 | 15.7 | 30 | 0.30 | 318 |
| 18 | 14.0 | 28 | 0.29 | 332 |
| 19 | 6.8 | 86 | 0.37 | 297 |
| 20 | 4.3 | 52 | 0.41 | 288 |
| 21 | 11.9 | 48 | 0.36 | 326 |
| 22 | 12.1 | 43 | 0.35 | 342 |

What is claimed is:

1. A process for preparing shaped catalysts or carriers mainly containing titanium oxide which comprises calcining a material mainly comprising titanium oxide or a substance convertible into titanium oxide on calcination in the presence of metatitanic acid sol or gel, said metatitanic acid sol being the one prepared by deflocculation of metatitanic acid obtained in the course of the production of titanium oxide according to a conventional sulfuric acid process and said metatitanic acid gel being the one prepared by adjusting said metatitanic acid sol to pH 1 or higher.

2. The process according to claim 1, wherein the material mainly comprises metatitanic acid.

3. The process according to claim 1, wherein the material mainly comprises powdery titanium oxide.

4. The process according to claim 1, wherein a suspension comprising the material and the metatitanic acid sol or gel is applied onto the surface of a shaped material having substantially no catalytic activity to form a coating layer and the resulting coated material is calcined.

5. The process according to claim 1, wherein shaping is carried out prior to the calcination.

6. The process according to claim 1, wherein the calcined product is crushed to powder, the resulting powder is shaped and the shaped product is calcined.

7. The process according to claim 6, wherein metatitanic acid sol or gel is incorporated into the powder on shaping.

8. The process according to claim 1, wherein the deflocculation is carried out by the use of barium chloride.

9. The process according to claim 8, wherein the resulting metatitanic acid sol is dried by spraying and calcined in an oxidative atmosphere.

10. The process according to claim 1, wherein the calcination is carried out at a temperature of from 200 to 800° C to obtain a shaped catalyst or carrier having a relatively large surface.

11. The process according to claim 1, wherein the calcination is carried out at a temperature of from 800 to 1200° C to obtain a shaped catalyst or carrier having a relatively small surface.

12. The process according to claim 6, wherein the calcination of the shaped product is carried out at a temperature of from 200° to 800° C.

13. The process according to claim 6, wherein the calcination of the shaped product is carried out at a temperature of from 800 to 1200° C.

14. The process according to claim 1, wherein the material is admixed with at least one of vanadium compounds, borates, carbon, silicates and phosphates in an amount of not more than 5% by weight on the weight of the titanium oxide in the catalyst or carrier.

15. The process according to claim 1, wherein the material is admixed with at least one of silica sol, clay, titanium sulfate and ceramic fiber in an amount of not more than 30% by weight on the weight of the material.

16. The process according to claim 7, wherein the powder is admixed with a glass fiber comprising $SiO_2$ in 10 – 65% by weight, $A_2O_3$ in 2 – 6% by weight, $CaO + MgO$ in 15 – 20 % by weight and $Na_2O + K_2O$ in 8 – 12 % by weight in an amount of not more than 30 % by weight on the weight of the powder.

17. A shaped catalyst or carrier prepared by the process of claim 1.

* * * * *